(12) United States Patent
Thomas

(10) Patent No.: US 8,899,377 B2
(45) Date of Patent: Dec. 2, 2014

(54) ACOUSTICALLY OPTIMIZED AIR CONDITIONING COMPONENTS

(75) Inventor: Christian Thomas, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 109 days.

(21) Appl. No.: 13/517,744

(22) Filed: Jun. 14, 2012

(65) Prior Publication Data

US 2012/0267476 A1   Oct. 25, 2012

Related U.S. Application Data

(63) Continuation of application No. PCT/EP2010/069570, filed on Dec. 14, 2010.

(60) Provisional application No. 61/286,300, filed on Dec. 14, 2009.

(30) Foreign Application Priority Data

Dec. 14, 2009 (DE) .......................... 10 2009 058 227

(51) Int. Cl.
*B64D 13/00* (2006.01)
*F16L 9/21* (2006.01)
*B64D 13/06* (2006.01)

(52) U.S. Cl.
CPC .................. *B64D 13/00* (2013.01); *Y02T 50/56* (2013.01); *Y02T 50/44* (2013.01); *F16L 9/21* (2013.01); *B64D 2013/0625* (2013.01)
USPC ............................................ 181/224; 454/76

(58) Field of Classification Search
CPC ........... B64D 13/00; B64D 2013/0625; Y02T 50/56; F16L 9/21; F16L 55/0336
USPC .................. 181/224, 225, 229, 246; 244/1 N; 454/76

See application file for complete search history.

(56) References Cited

U.S. PATENT DOCUMENTS 4,993,513 A * 2/1991 Inoue et al. ................... 181/282
6,202,702 B1   3/2001 Ohira et al.
(Continued)

FOREIGN PATENT DOCUMENTS

DE    20105081 U1    5/2001
WO    03081119 A1   10/2003

OTHER PUBLICATIONS

Wikipedia Page For Polyimide Foam, accessed Nov. 26, 2013.*
German Patent Office, German Office Action dated Nov. 2, 2010 for German Patent Application No. 10 2009 058 227.4.

(Continued)

*Primary Examiner* — Jeremy Luks
(74) *Attorney, Agent, or Firm* — Ingrassia Fisher & Lorenz, P.C.

(57) ABSTRACT

Systems and methods for sound damping in air conditioning systems in an aircraft is provided. In one embodiment, an air conditioning conduit can comprise a sound-damping wall that at least partially encloses a continuous hollow space for guiding the air. The wall comprises a multilayer design with a core layer and at least one first cover layer. The core layer comprises a sound-absorbing open-pore core material so that the wall shows an acoustic effect. The first cover layer is airtight, is arranged on the external surface of the core layer, and is two-dimensionally connected to the core layer. The two-dimensional connection between the core layer and the first cover layer causes a composite effect in such a manner that the wall is self-supporting and has a structural function in order to be able to transfer mechanically-occurring loads to structural parts of the aircraft.

12 Claims, 3 Drawing Sheets

(56) References Cited

U.S. PATENT DOCUMENTS

| | | | |
|---|---|---|---|
| 7,546,899 B2 * | 6/2009 | Tomerlin et al. | 181/252 |
| 7,815,012 B2 | 10/2010 | Holmgren et al. | |
| 8,006,722 B2 | 8/2011 | Hesse et al. | |
| 8,079,443 B2 | 12/2011 | Keller | |
| 2009/0200103 A1 | 8/2009 | Potschka | |
| 2009/0260706 A1 * | 10/2009 | Hesse et al. | 138/144 |
| 2009/0298408 A1 | 12/2009 | Reisbach | |

OTHER PUBLICATIONS

Saudi Basic Industries Corporation (SABIC) Innovative Plastics, Ultem Resin and Ultem Foam Producer Brochure, 2012, pp. 2-3., The Netherlands.

International Searching Authority, International Search Report dated Aug. 31, 2011 for International Application No. PCT/EP2010/069570.

\* cited by examiner

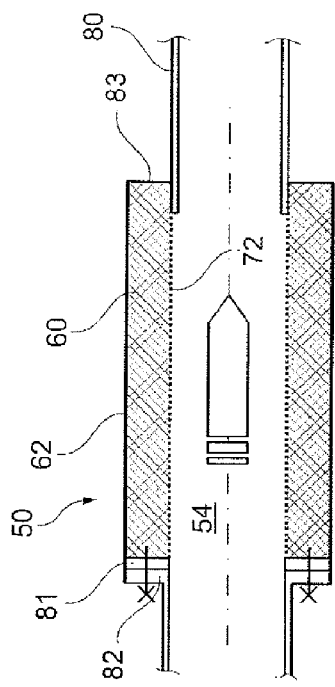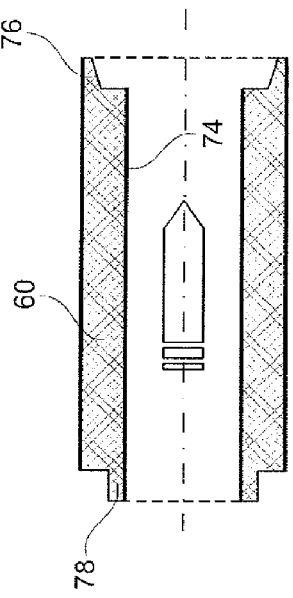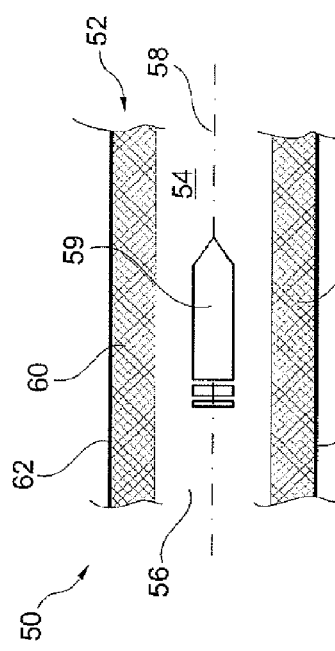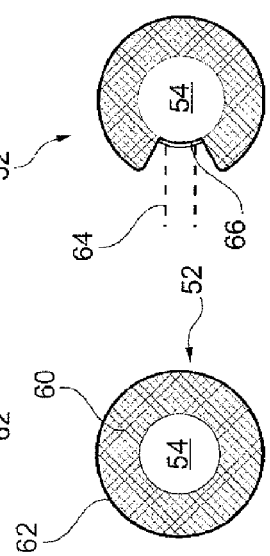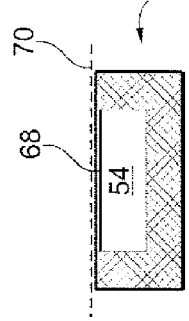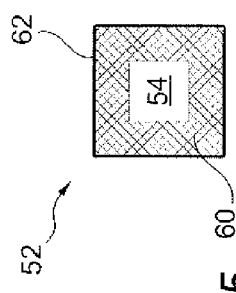

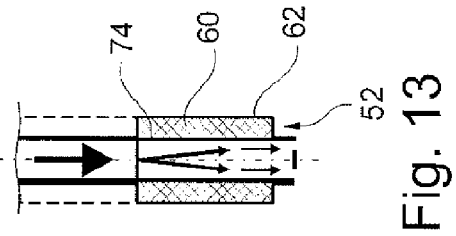
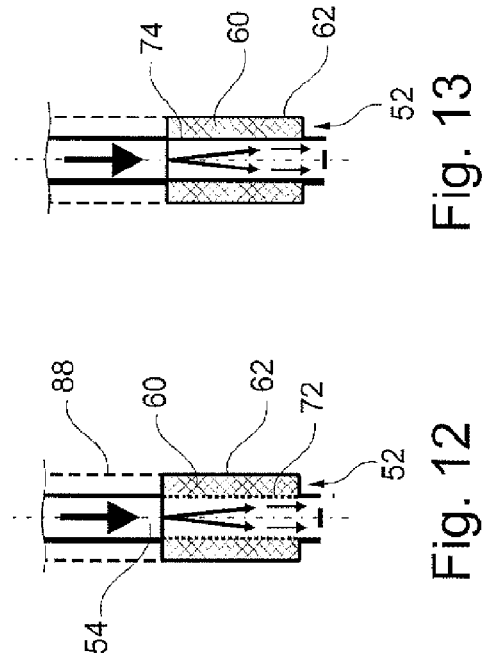
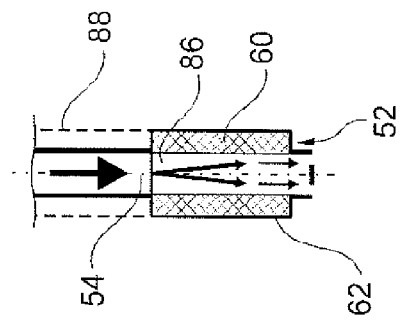
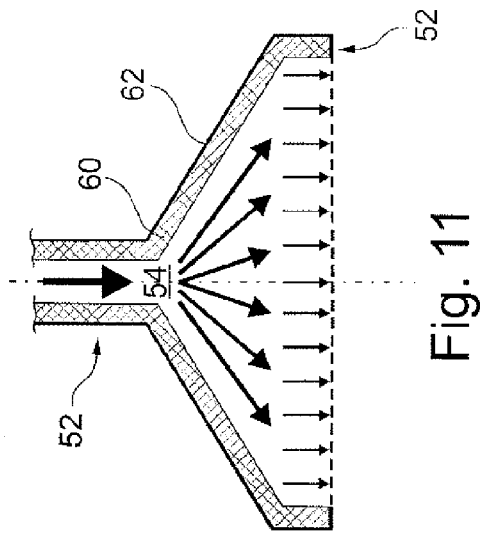
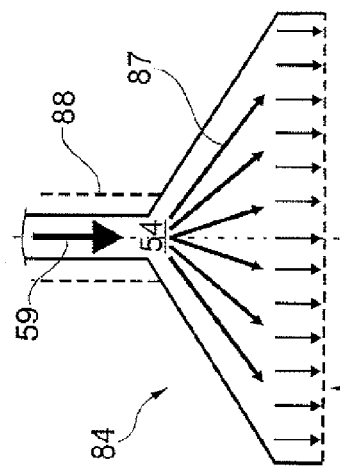

ACOUSTICALLY OPTIMIZED AIR CONDITIONING COMPONENTS

CROSS-REFERENCE TO RELATED APPLICATIONS

This is a continuation of International Application No. PCT/EP2010/069570, filed Dec. 14, 2010, which application claims priority to German Patent Application No. 10 2009 058 227.4, filed Dec. 14, 2009 and to U.S. Provisional Patent Application No. 61/286,300, filed Dec. 14, 2009, which are hereby incorporated by reference in their entirety.

TECHNICAL FIELD

The technical field relates to sound damping, or sound deadening, in air conditioning systems in an aircraft. In particular, the present disclosure relates to an air conditioning conduit for an aircraft and to an airplane comprising air conditioning conduits.

BACKGROUND

Apart from the engines and the external airflow around the fuselage, the air conditioning system of a modern aircraft may be one of the significant noise sources of the airplane in terms of noise input into the interior of the airplane, in other words, for example, into the cockpit and the cabin region. The noise may be generated by the fans of the air conditioning system, and may be transmitted within the pipe system for the air conduit. Subsequently, the noise may be emitted to the cabin by way of the air outlets. In order to reduce this noise component, sound absorption devices can be integrated in the noise path, for example in the pipe system of the air conditioning system. For example, on the outside of a pipe layout an acoustic absorber, e.g. comprising glass wool, is applied; however, for this purpose the wall between the absorber and the flowing air needs to be perforated or of a grid-shaped design. In addition, on the outside of the absorber an airtight layer is provided. In order to prevent abrasion of the usually very light absorber that is susceptible to being damaged, between the perforated wall and the absorber material a woven material can be inserted that prevents the air flow from taking small particles from the absorber material and the air carrying them along. In DE 10 2006 050 869 a sound absorption device for an air pipe is described in which within a curved pipe section an acoustic element is arranged. However, it has been shown that such measures require a large design space and, furthermore, are associated with additional weight when correspondingly high sound damping is to be achieved, which in turn is demanded by the increasing standards of amenity values for the stay in cabin spaces of airplanes.

There may thus be a need for providing an air conditioning conduit for use in an aircraft, which air conditioning conduit is optimized in terms of the required design space and weight, wherein at the same time the best-possible sound-damping characteristics are to be achieved. In addition, other objects, desirable features and characteristics will become apparent from the subsequent summary and detailed description, and the appended claims, taken in conjunction with the accompanying drawings and this background.

SUMMARY

According to various aspects, an air conditioning conduit with a sound-damping effect for an aircraft and an airplane with an air conditioning system that comprises air conditioning conduits according to the present disclosure with a sound-damping effect are provided.

According to an exemplary embodiment, an air conditioning conduit with a sound-damping effect for an aircraft is provided, which air conditioning conduit comprises a sound-damping wall that at least partially encloses a continuous hollow space for guiding the air, wherein the continuous hollow space comprises an air inlet opening and an air outlet opening, and wherein the hollow space for the conveyance of air directly adjoins the wall. The wall comprises a multilayer design with a core layer and at least one first cover layer. The core layer comprises a sound-absorbing open-pore core material so that the wall shows an acoustic effect. The first cover layer is designed so as to be airtight, is arranged on the external surface of the core layer, and is two-dimensionally connected to the core layer. The laminar connection between the core layer and the first cover layer causes a composite effect in such a manner that the wall is self-supporting and has a structural function in order to be able to transfer mechanically-occurring loads to structural parts of the aircraft so that the wall apart from an acoustic effect also comprises a load-bearing effect.

It should be pointed out that within the scope of the present disclosure the term "air conduit" refers both to air inflow to the cabin space and to air outflow from the cabin space.

The partial enclosure of the air conduit is suitable for, for example, when the air conduit has several branches at relatively short distances so that the sound-deadening wall would have to be penetrated several times. Furthermore, partially enclosing the air conduit is also suitable, for example, in the case of air conduits that need to be accommodated in a particularly narrow design space, e.g. between the external wall of a fuselage structure with thermal insulation arranged thereon and a cabin panel spaced apart at close distance so that only a small hollow space in the wall structure is available for accommodating the air conduits. It is then possible, for example, to construct the two wall regions facing the respectively adjoining boundary surfaces so that they are thin, i.e. without any sound-deadening effect, while the sound-deadening effect is achieved where there is adequate available space, e.g. at the top or bottom of the air conduit.

Only partial enclosure by the wall furthermore provides an advantage in that the wall of an air conduit along a thermally effective surface, for example an external wall, can directly rest against said thermally effective surface, and consequently the air can, for example, be additionally cooled on the external wall while it is transported through the air conduit system.

Since as a result of the composite effect the first cover layer and the core layer are self-supporting, the wall can assume static functions, wherein the core layer at the same time also assumes the acoustic tasks. Consequently it is possible to design the walls so that they are lighter in weight and thinner.

The term "self-supporting" means that the wall, in the region where it encompasses the hollow space at least in part, forms the enclosing surface and also the constructional wall. An additional wall, e.g. a pipe wall for closing off the hollow space, or a pipe wall that carries a sound-absorbing (additional) layer is generally not provided for.

The wall according to the present disclosure contributes, for example, in two ways to a reduction in sound. Firstly, the transmission of the sound is reduced, which sound is present within the hollow space. This can, for example, relate to sound waves that have been generated by the air flowing through the hollow space. This can also relate to sound waves resulting from those components that condition the air and/or handle the conveyance of air, for example fans. The wall according to the present disclosure attenuates the transmission of sound to the exterior, for example in particular where air conditioning conduits runs in the cabin interior, or extend at least so as to be adjacent to the cabin interior.

Apart from this, the wall according to the present disclosure also reduces the sound within the air conduit, i.e. within the hollow space, because the core layer is absorbent, thus lowering the noise level within the air conduit, e.g. within an air conduit device or channel. This of course also results in reduced noise emission through the wall to the exterior. However, this above all also means that in those locations in which the air emanates from the air conditioning conduit, e.g. into the cabin interior, a reduced sound load emanates, together with the air. Sound absorption relates, for example, to the sound generated by the conveyance of air itself, and also to the sound generated by the fans, or similar, themselves, which sound propagates through the air conduit devices.

In one example, the absorption effect is achieved in that at least part of the enclosing surfaces of the air conduit device is designed as an air conditioning conduit with a sound-deadening wall.

According to an exemplary embodiment of the present disclosure, the entire enclosing surface comprises a sound-deadening wall.

According to an exemplary embodiment, the core layer is designed so as to thermally insulate the hollow space vis-à-vis the surroundings.

Thermal insulation makes it possible for the temperature of the air to be introduced into the cabins or into the cockpit space not to change at all or to change insignificantly within the air conduit, for example within a pipe system. This is of importance in particular if the air conduit is arranged in the region of external wall surfaces of the fuselage structure, because fluctuations in temperature may occur in these regions.

According to an exemplary embodiment, the core layer is statically effective. The open-pore core material provides an advantage in that on the one hand it is effective as a porous absorber, and on the other hand because of the laminar connection of the core material to the first cover layer it provides a multilayer structure with good specific mechanical and static characteristics. The airtight design of the first cover layer prevents the conditioned air from leaving the air conduit through the wall.

According to an exemplary embodiment, the core layer comprises a pressure-resistant material. According to another exemplary embodiment, the core layer comprises an open-pore foam material. According to an exemplary embodiment, the open-pore foam material is a hard foam material. The use of a foam as a core material may provide an advantage in that already at the time of manufacturing the wall, for example as a semi-finished product, the thickness of the core layer to be used later can be taken into account. At the same time an open-pore foam material also provides good thermal insulation characteristics.

According to an exemplary embodiment, the foam material comprises low density. For example, the foam material comprises a density of about max. 300 kg/m$^3$, e.g. a density of about max. 150 kg/m$^3$. According to another exemplary embodiment, the foam material comprises a density of about 30 kg/m$^3$ to about 110 kg/m$^3$. In another exemplary embodiment, the foam material comprises a compressive strength of approx. 200 kPa to approx. 1500 kPa at a density of between approx. 30 kg/m$^3$ and approx. 120 kg/m$^3$.

According to an exemplary embodiment, the foam material comprises a flexural rigidity of about 200 kPa to approx. 2200 kPa at a density of between approx. 30 kg/m$^3$ and approx. 120 kg/m$^3$.

According to an exemplary embodiment, the foam material comprises a shear strength or transverse strength of about 400 kPa to approx. 1500 kPa at a density of between approx. 30 kg/m$^3$ and approx. 120 kg/m$^3$.

According to an exemplary embodiment, the foam material comprises a tensile strength of about 500 kPa to approx. 3000 kPa at a density of between approx. 30 kg/m$^3$ and approx. 120 kg/m$^3$.

For example, the core layer comprises a high-performance thermoplastic material, e.g. an amorphous polyetherimide plastic material.

According to an exemplary embodiment, the first cover layer is designed so as to be sound-damping. This prevents sound, which has, for example, not been completely absorbed by the absorber, from emitting from the air conduit to the outside. Consequently it is possible to arrange air conditioning conduits directly behind surfaces that close off cabin space that have no or very slight noise-damping characteristics.

A noise-damping design of the first cover layer makes it possible to arrange air conditioning conduits in close proximity to external noise sources, in other words to noise sources that are not in direct connection with the air conditioning conduit, without this resulting in sound input from these noise sources into the air conduit region, from which the sound could be transmitted to the cabin space by way of the air conduit.

An integral design of the first cover layer and the core layer provides economical and ecological advantages during processing and installation as well as during manufacture, because the required expenditure for materials and handling is reduced to a minimum.

According to one of various exemplary embodiments, the first cover layer is designed so as to be integral with the core layer. According to another exemplary embodiment, the first cover layer is closed off towards the outside in an airtight manner by means of a thin foil. In another exemplary embodiment, the first cover layer is closed off towards the outside in an airtight manner by means of a varnish or a coating.

According to an exemplary embodiment, the first cover layer is designed so as to form one piece with the core layer. According to another exemplary embodiment, the first cover layer has been produced by closing the outer pores of the open-pore core material. According to yet another exemplary embodiment, the first cover layer has been produced by compressing the outer layer of the core material. Furthermore, compressing the outer layer of the core material makes it possible first to adjust the thickness of the core layer, for example by removing material, to match the respective purpose of use, and only then to produce the first cover layer by compressing.

In a further exemplary embodiment, the first cover layer is produced by melting the outer region of the core material.

According to an exemplary embodiment, a second cover layer is provided, which is arranged on the internal surface of the core layer, wherein the second cover layer is designed so as to be acoustically transparent.

In the context of the present disclosure the term "acoustic transparency" relates to the characteristic of letting the noise impinging on the surface pass into the core layer with as little hindrance as possible. In this arrangement, acoustic transparency relates, in one example, to the frequency range of speech intelligibility, in order to prevent noise input in this frequency range into the cabin region. Usually, a range of about 500 to about 4,000 Hz is stated in relation to speech intelligibility.

Acoustic transparency also means that sound waves are to be allowed to pass as far as possible in the entire mentioned frequency range. Only if this is the case is it possible to influence the acoustics in terms of an improvement in the amenity value in the cabin region.

Put simply, acoustic transparency is determined by the interaction between the materials used and their attachment or construction. At first a distinction is to be made between air-permeable and air-impermeable materials. The acoustic transparency of air-permeable materials is characterized by their flow resistance. Air-impermeable materials comprise acoustic transparency under certain boundary conditions. For example, a thin, lightweight, panel-shaped air-impermeable material when loosely hung can transmit a frequency range without any hindrance in that the panel does not provide any resistance, or almost no resistance, to air oscillations, and the sound waves can pass through the layer without any hindrance, or almost without any hindrance. These materials are thus characterized by a very low frequency-dependent noise insulation value. In contrast to this, the same material in a firmly mounted state, in particular when mounted at short spacing, provides significantly greater resistance to the impinging sound waves. Thus when assessing the acoustic transparency the actually achieved effect is of decisive importance, rather than an isolated view of a material per se, or merely consideration of a particular design.

According to an exemplary embodiment, the second cover layer comprises a flow resistance not exceeding 1000 Ns/m$^3$. According to another exemplary embodiment, the second cover layer is perforated. According to yet another exemplary embodiment, the second cover layer comprises microperforation. In another exemplary embodiment, the second cover layer is designed so as to be airtight. According to yet another exemplary embodiment, the second cover layer is impermeable to moisture.

Designing the second cover layer so that it is impermeable to moisture suggests itself, for example, in regions where, for example due to condensation, humidity can arise within the air conduit system. By preventing the ingress of humidity into the absorbing core material, the acoustic function, in other words the sound insulating effect, is maintained or can be ensured. Furthermore, a second cover layer that is impermeable to moisture also provides advantages for cleaning, for example in the case of particularly high-use air conduit regions or in air conduit regions that have a tendency to become soiled.

According to an exemplary embodiment, the second cover layer is designed as a vapor retarder.

In the context of the present disclosure, the term "vapor retarder" relates to a layer, e.g. a foil, by which diffusion of water vapor into the layer situated behind it, i.e. the acoustically effective core layer, is limited. In other words the term "vapor retarder" designates a layer with vapor-diffusion-inhibiting characteristics. Layers having a water vapor diffusion resistance, also known as $s_d$-value that shows the diffusion-equivalent thickness of an air layer, that comprise an $s_d$-value of about 0.5 m to about 1500 m are deemed to be diffusion inhibiting.

According to another exemplary embodiment, the second cover layer is designed as a vapor barrier.

In the context of this present disclosure, the term "vapor barrier" relates to a layer, e.g. a foil, by which diffusion of water vapor into the layer situated behind it, i.e. the acoustically effective core layer, can be prevented, wherein a layer with an $s_d$-value exceeding about 1500 m is generally considered to be practically completely vapor-diffusion-proof.

According to one of various exemplary embodiments, the second cover layer is connected to the core layer in a laminar fashion. In one exemplary embodiment, the laminar connection between the core layer and the second cover layer causes a composite effect in such a manner that the wall is self-supporting.

According to another exemplary embodiment, the core layer together with the first cover layer and the second cover layer forms a sandwich-like wall structure.

According to an exemplary embodiment, at its face ends the wall comprises a closing-off top layer that closes off the core material in an airtight manner on the surfaces facing outwards. According to another of various exemplary embodiments, the material of the closing-off cover layer corresponds to the material of the first cover layer. According to an exemplary embodiment, the closing-off cover layer is formed in one piece with the first cover layer.

In one of various exemplary embodiments, the continuous hollow space is designed to extend in longitudinal direction, and the sound-dampening wall encloses the hollow space on the longitudinal sides at least partially. According to one exemplary embodiment, the continuous hollow space is designed to extend in longitudinal direction, and the sound-dampening wall encloses the hollow space on the longitudinal sides completely. Complete enclosure provides an advantage in that a compact external wall can be formed so that uniform conditions exist for fastening. For example, air conduit elements with a uniform cross section can be formed, which cross section is suitable for fastening, for example by means of pipe clamps.

According to an exemplary embodiment, the air outlet opening is designed as an air outlet opening for introducing air into a cabin interior space. According to one of various exemplary embodiments, the air outlet opening comprises a fan-shaped air outlet, and the sound-dampening wall is arranged on the lateral surfaces of the fan. Since, in relation to the air supply, the air outlet openings represent the final or last element, providing a sound-damping effect in this region is of particular importance, irrespective of the provision of, for example, nozzle-like openings to which special attention should be accorded in terms of possible sound development.

Furthermore, as a further exemplary embodiment, an airplane comprising a fuselage structure and a cabin formed within the fuselage, as well as comprising an air conditioning system, is provided, with the air conditioning system comprising an air conditioning unit, and air conduits with air outlet openings, wherein the air conduits convey the air from the air conditioning unit to the air outlet openings in order to feed the conditioned air into the cabin space, and wherein the air conduits at least partially comprise an air conditioning conduit according to any one of the various preceding embodiments.

In this manner an aircraft is provided in which the acoustic interior space conditions in the cabin or in the cockpit have been improved to the extent that no sound input takes place by way of the air conduits of the air conditioning system. Apart from a reduction in the sound input through the air conduits into the interior, the air conditioning conduits with a sound-deadening effect also ensure a more compact, i.e. more slender and more lightweight, design. The more compact design at the same time means that less design space is required so that within the fuselage construction of the aircraft more space is available for actual use. In other words, as a result of the more compact design the space available for passengers can be optimized or increased. Furthermore, the more compact design also makes it possible to achieve more air changes per unit of time, because the internal cross section in the air conditioning conduit can be increased while maintaining the hitherto commonly used external dimensions, because the multilayer wall structure according to the present disclosure provides improved acoustic absorption characteristics with a reduced cross section, while providing at least equal stability.

There is a further advantage in that the air conditioning conduits overall are more lightweight because due to the composite effect of the core layer with the first cover layer adequate stability results and the hitherto commonly used pipes, for example comprising plastic, are no longer required. In other words, by the air conditioning conduits according to the present disclosure, the hitherto commonly used pipe designs with the additional absorbers can be replaced, which results in the already mentioned weight savings. Because, for example, within a commercial aircraft overall a very large number of linear meters of air conditioning conduits are installed, these savings in weight are not insignificant. A reduction in the vehicle weight at the same time equates to a reduction in the fuel consumption of the aircraft, or allows a larger additional load or payload with the same fuel consumption.

It should be pointed out that, in terms of wording, the above presentation of the exemplary embodiments as well as of the following description of examples, and the claims, are stated with a view to an aircraft, wherein at times reference is made to an airplane. In the context of the present disclosure the term "aircraft", apart from referring to airplanes, also refers to other aircraft, in particular also to helicopters. The present disclosure and the scope of protection of the claims thus relate to aircraft in general, for example to airplanes and helicopters, in particular also to commercial aircraft.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

FIG. 2 is a diagrammatic view of a longitudinal section of an air conditioning conduit according to one of various exemplary embodiments;

FIG. 3 is a diagrammatic cross section of the air conditioning conduit according to FIG. 2;

FIG. 4 is a diagrammatic cross-sectional view of a further exemplary embodiment of an air conditioning conduit;

FIG. 5 is a cross section of a further exemplary embodiment;

FIG. 6 is a cross section of a further exemplary embodiment;

FIG. 7 is a longitudinal section of a further exemplary embodiment of an air conditioning conduit;

FIG. 8 is a further exemplary embodiment of an air conditioning conduit;

FIG. 9 is a diagrammatic longitudinal section of an exemplary embodiment with an air conditioning conduit designed as a fan-shaped air outlet opening;

FIG. 10 is a section, across the fan direction, of the air conditioning conduit according to FIG. 9;

FIG. 11 is a longitudinal section of a further exemplary air outlet opening;

FIG. 12 is a section, across the fan direction, of a further exemplary air outlet opening; and FIG. 13 is a further exemplary embodiment of an air outlet opening.

DETAILED DESCRIPTION

Figure 1:
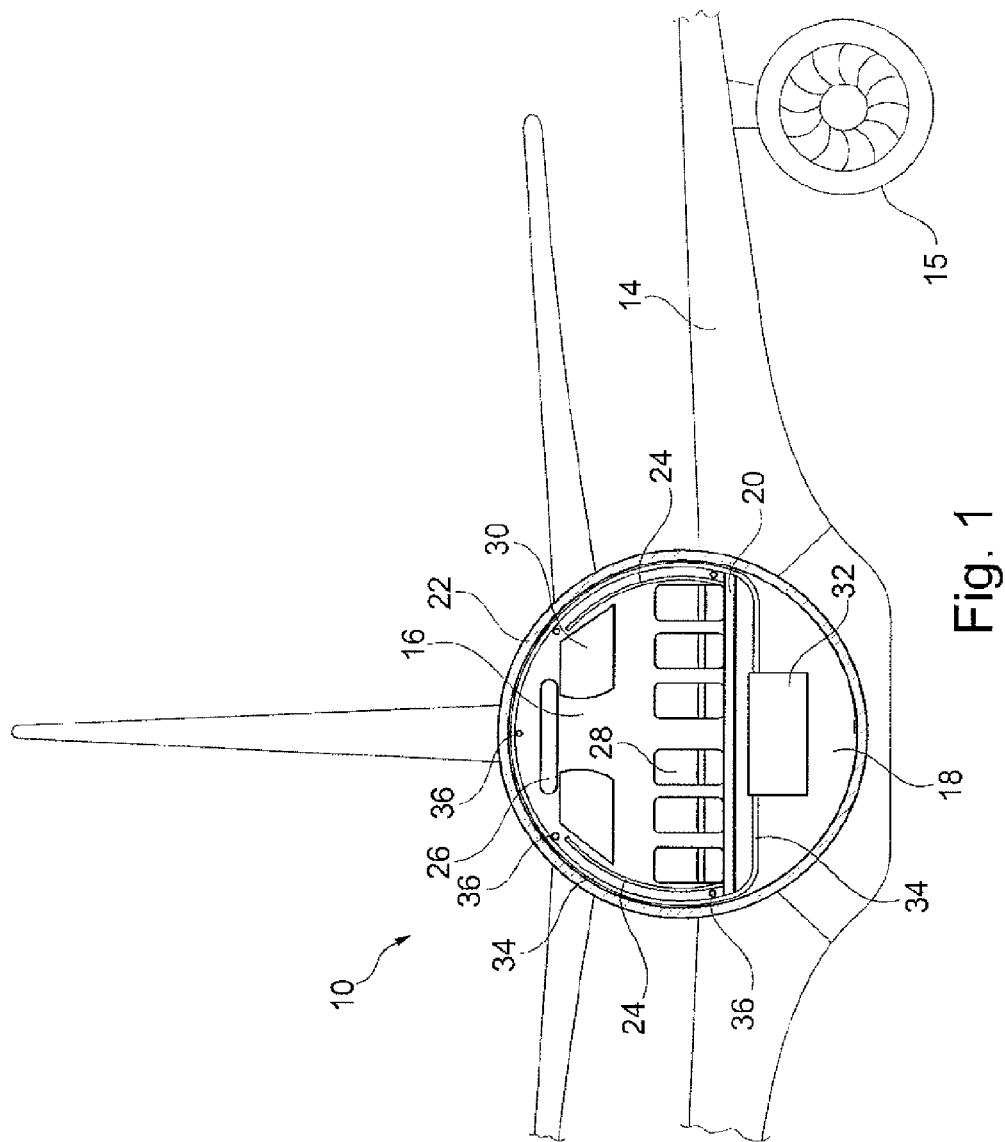
FIG. 1 is a cross section of an airplane with an air conditioning system comprising air conditioning conduits.

The following detailed description is merely exemplary in nature and is not intended to limit the present disclosure or the application and uses of the present disclosure. Furthermore, there is no intention to be bound by any theory presented in the preceding background or the following detailed description.

FIG. 1 shows an airplane 10 with an airplane fuselage 12 and two wings 14, laterally following on from the aforesaid, with engines 15 being provided on said wings 14. In FIG. 1 the airplane fuselage 12 is shown in section view across its longitudinal axis. The airplane fuselage 12 is partitioned to form an upper cabin region 16 and a cargo region 18, arranged underneath it, by a horizontally-extending floor 20. Furthermore, the airplane fuselage 12 comprises a generally circumferential aircraft outer skin 22 that is attached to an airplane fuselage structure (not shown in detail). In simple terms the airplane fuselage structure comprises a kind of supporting structure made of frame elements and stringers, thus ensuring a stable design for taking up the external and internal loads.

In the cabin region 16, arranged above the floor 20, along the external wall 22 there are lateral cabin linings 24 as well as an upper cabin lining 26 provided in the upper region. The elements of the cabin lining 24, 26 together with the floor 20 enclose an interior space, in other words the cabin. Within the cabin, for example, seats 28 for passengers are arranged. Furthermore, for example, baggage compartments 30 are provided, which generally are situated above the seat rows and are used to accommodate the cabin baggage of passengers. Furthermore, the cabin region 16 also comprises various supply lines (not shown in FIG. 1), for example relating to an emergency oxygen supply, electrical supply etc.

For the purpose of supplying the cabin region 16 with adequate fresh air of suitable composition, outside the cabin region 16 an air conditioning unit 32 of an air conditioning system of the airplane 10 is provided. The air conditioning unit 32 is, for example, arranged in the region underneath the floor 20, for example in the middle of the airplane, just in front of the wing box, in other words in a position in which use of the cargo region 18 is not impeded, because in this location usually a center tank for fuel is provided, and consequently the cargo space is already divided.

The air conditioning unit 32 is used to supply adequate fresh air to the passenger region or cabin region 16, as well as to the cockpit (not shown), and to remove used or consumed air from these regions. To this effect the air conditioning unit 32 among other things comprises a temperature control unit (not shown in detail) by means of which the incoming air to the cabin can be cooled or heated to a desired extent. Furthermore, an air humidity regulating unit (not shown in detail) is provided, by means of which the incoming air intended for the cabin can be set to a desired humidity.

By way of supply lines 34 the air conditioning unit 32 is connected to distribution lines 36 that can, for example, be arranged between the aircraft outer skin 22 and the lateral cabin linings 24 and the upper cabin lining 28. On the distribution lines 36, which generally extend in longitudinal direction of the aircraft, a multitude of air inlets or suction openings (not shown in FIG. 1) are provided, by which the incoming air is supplied to the cabin region 16, or the outgoing air is removed from the cabin region 16. For example, feeding the incoming air to the cabin takes place at a lower region of the lateral cabin linings 24 and removing, by suction, the used air takes place in an upper region of the lateral cabin linings 24 or in the region of the upper cabin lining 28.

The supply lines 34 can also be connected to a central distribution line, which starting from the air conditioning unit 32 at first represents a main conduit provided in longitudinal direction of the airplane, wherein several supply lines 34 branch off (not shown in detail) from said main conduit.

In order to provide conditions within the cabin that in terms of temperature are suitable for passengers, in the external wall structure, for example, thermal insulation is provided.

Furthermore, the external wall structure is designed so as to be as sound-insulating as possible so as to limit to a minimum the noise input from the turbines 15 to the cabin 16. Apart from the space-enclosing function of the cabin lining elements 24, 26 the latter can also be used for influencing the acoustic conditions within the cabin 16. To this effect the cabin panels 24, 26 can, for example, comprise a sound-absorbing design.

Apart from the engines 15 and the external airflow around the fuselage along the aircraft outer skin 22, the air conditioning system is a further noise source acting on the interior space, in other words the cabin region 16. The noise is generally generated by the fans of the air conditioning system, which fans are provided in the air conditioning unit 32 in order to ensure the necessary air conveyance to the cabin 16 and from the cabin 16. The noise of the fans is transmitted within the pipe system and is finally emitted into the cabin 16 by way of the air outlets.

In order to reduce this noise source or fraction, according to the present disclosure it is provided to integrate an air conditioning conduit with a sound-damping effect according to various embodiments in the noise path, in other words between the air conditioning unit 32 and those positions at which the air is blown into the cabin region 16 or removed, by suction, from the cabin region 16.

According to one of various exemplary embodiments, FIG. 2 shows an air conditioning conduit 50 in which a sound-damping wall 52 at least partially encloses a continuous hollow space 54 for conveying the air. The continuous hollow space 54 comprises an air inlet opening 56 and an air outlet opening 58, i.e. the air can flow through the hollow space 54, or the air conditioning conduit conveys the air, which is indicated by an arrow 59.

As shown in the figures, for conveying air the hollow space directly adjoins the wall. The wall thus at least in some regions forms the lateral closing-off device of the hollow space, i.e. the conveyed gaseous medium, for example incoming air or outgoing air in the case of an aircraft cabin, is in direct acoustic contact with the wall, which can thus also have a direct sound-deadening effect on the region of the hollow space.

The wall 52 comprises a multilayer design with a core layer 60 and at least one first cover layer 62. The core layer 60 comprises a sound-absorbing open-pore core material. The first cover layer 62 is designed so as to be airtight, is arranged on the external surface of the core layer 60, and is laminarily connected to the core layer 60. The laminar connection between the core layer 60 and the first cover layer 62 causes a composite effect to such an extent that the wall 52 is self-supporting and comprises a structural function in order to be able to transfer mechanically-occurring loads to structural components of the aircraft.

As a result of the core material, the wall has an acoustic effect. As a result of the composite effect, the wall also has a load-bearing effect or structural effect. The wall thus assumes two different functions, i.e. the static function of load bearing and taking up, or the transmission and distribution of loads that are experienced, for example intrinsic weight, vibration, pressure differentials etc., and the acoustic attenuation or insulation, in other words the reduction in the sound emission resulting from the air conduit.

According to the exemplary embodiment shown, the core layer 60 comprises an open-pore foam material. The use of a foam as a core material is associated with an advantage in that already at the time of manufacturing the wall, for example as a semi-finished product, the thickness of the core layer 60 that will be used later can already be taken into account. At the same time an open-pore foam material also provides good thermal insulation characteristics and outstanding absorption characteristics.

Preferably, the core layer 60 also provides thermal insulation from the surroundings, for example from the space between the external skin 22 and the cabin linings 24 or 26.

The core layer 60 is statically effective so that an additional wall, for example a plastic tube, is not required in the region of the wall 52. This equates to a more lightweight construction which at the same time provides improved acoustic characteristics, because the core layer 60 together with the first cover layer 62 thus not only assumes the static function and thermal insulation, but also the acoustic task of noise absorption. The core layer 60 thus functionally and constructionally takes the place of a conventional pipe wall. In addition, the core layer 60 also handles the acoustic dampening or insulation. The function of an airtight closing device is, for example, assumed by the first cover layer 62. According to a further example, the core layer 60, at least in its overall effect, is designed so as to be airtight over the entire cross section. For example, air and thus also airborne sound can enter the core layer 60, but it generally cannot pass through said core layer 60 to the outside, at least not to an extent where it would impede the conveyance of air.

In this arrangement the core layer 60 can, for example, completely enclose the hollow space as shown in the figures. According to another embodiment (not shown), the core layer 60 can be provided in selected parts, whereas the other regions are enclosed by differently-designed wall regions, e.g. by thinner walls in the case of confined installation space, or by cooling surfaces, e.g. at regions of the outer wall.

The air conditioning conduit 50 is, for example, a tubular air conduit for supplying fresh air to the cabin space 16 or for removing used air from the cabin space 16.

According to an exemplary embodiment, the wall 52 generally completely encloses the continuous hollow space 24 as diagrammatically shown in FIG. 3.

According to another exemplary embodiment, the wall 52 partially encloses the hollow space 54, which is suitable, for example, in air conduit regions in which a multitude of branches are provided, as indicated, for example, in FIG. 4 by a branch 64. The region not enclosed by the wall 52 is closed off by a covering wall 66 to which the branches can be connected.

Apart from the circular cross sections shown (FIG. 3 or FIG. 4), the air conditioning conduit according to the present disclosure can also comprise other cross-sectional shapes, for example oval or ellipsoidal shapes, or square or rectangular shapes, as indicated in FIG. 5, wherein in that exemplary embodiment the wall 52 completely encloses the hollow space 54.

FIG. 6 shows another exemplary embodiment of a rectangular cross section in which the wall 52 partially encloses the hollow space 54. Consequently it is possible, for example, to create a wall region 68 on that side of the hollow space 54, which wall region 68 closes off the hollow space towards this side and which at the same time can be provided to establish thermal contact with a thermally usable surface 70 (only indicated by a dashed line in FIG. 6).

For example, the air conditioning conduit according to FIG. 6 can be provided when the air in the hollow space 54 is to be cooled by means of heat exchange by way of the wall region 68 or the surface 70, for example along an external wall region, in order to in this way reduce the cooling load of the air conditioning unit 32.

The exemplary embodiment shown in FIG. 6 can, for example, also be used to pre-heat air on a warm surface, for example a cabin lining. In this case the air can be heated, and at the same time the cabin interior region can be cooled in that the air conditioning conduit is routed along a cabin panel of the cabin lining 24, 26, and by way of the wall 68 a thermal contact to the cabin lining is established so that the passing air causes heat exchange. In this manner the incoming air conditioned by the air conditioning unit 32 is pre-heated before the air is blown into the cabin region 16.

According to another exemplary embodiment, the heat exchange by way of the wall area 68 can also be used for exhaust air in that, for example, the air being removed by suction is pre-heated or pre-cooled before it is conditioned in the air conditioning unit 32. For example, in the aforesaid a part of the air removed by suction is mixed with fresh incoming air in order to ensure a necessary minimum oxygen content in the cabin air.

The airtight design of the first cover layer 62 ensures that no air can emanate from the air conditioning conduit 50.

According to another of various embodiments (not further shown), the first cover layer 62 is designed so as to be sound insulating. Consequently, in those regions of the fuselage structure in which due to other noise sources noise input into the air conduit might occur, external noise can be prevented from reaching the cabin region by way of the air conduit.

According to another exemplary embodiment, the first cover layer 62 is designed so as to be integral with the core layer 60. For example, the first cover layer 62 is designed to be in one piece with the core layer 60.

According to one of various embodiments (not shown in further detail), the first cover layer 62 is generated by closing the outer pores of the open-pore core material of the core layer 60.

For example, the first cover layer 62 is generated by compressing the outer layer of the core material of the core layer 60, for example by melting the outer region of the core material, which is, however, not shown in further detail in the figures.

According to a further exemplary embodiment, which is shown in FIG. 7, a second cover layer 72 is provided that is arranged on the internal surface of the core layer 60, wherein the second cover layer 72 is designed so as to be acoustically transparent.

In the exemplary embodiment shown in FIG. 7, the second cover layer 72 is perforated; for example the second cover layer 72 comprises microperforation.

According to another exemplary embodiment, shown in FIG. 8, a second cover layer 74 is provided which is impermeable to moisture. The second cover layer 74, which is also arranged on the inside of the core layer 60, can, for example, be designed as a moisture retarder or even as a vapor barrier so that moisture is prevented from entering the core layer 60.

According to one of various embodiments, not shown in detail, the second cover layer 74 is designed so as to be airtight.

In order to ensure the acoustic effect of the core material of the core layer 60 the second cover layer 72, 74 must, however, in every case be designed so as to be acoustically permeable so that the sound can enter the core layer 60 in order to be absorbed therein.

For example, the second cover layer 72, 74 is laminarily connected to the core layer so that the laminar connection between the core layer 60 and the second cover layer 72, 74 causes a composite effect in such a manner that the wall is self-supporting. This makes it possible to achieve still better stability of the air conditioning conduit according to the present disclosure, because the core layer together with the first cover layer and the second cover layer forms a sandwich-like wall design.

According to the exemplary embodiment shown in FIG. 8, the air conditioning conduit according to the present disclosure on its face ends can comprise a coupling system so that the air conditioning conduits, which are, for example, provided as tubular elements or pipe segments, can be connected at their ends by being inserted into each other. This is indicated in FIG. 8 by an outward-facing circumferential projection 76 on the face of the core layer 60, and by an inward-facing second circumferential projection 78 provided on the opposite face end.

This coupling system can also be provided for the various exemplary embodiments described with reference to the other figures.

Of course, the projections 76, 78 are only one of many imaginable connection systems by which several air conditioning conduit segments according to the present disclosure can be interconnected.

Another exemplary embodiment provides for the various exemplary embodiments according to the present disclosure of the air conditioning conduit for an aircraft to be connected with commonly-used pipe segments, for example made of plastic, in which no acoustic absorbers are provided.

Such a connection is indicated in FIG. 7 in which on the right-hand face end of the air conditioning conduit segment a pipe segment 80 has been inserted into the air conditioning conduit 50.

Another exemplary embodiment is shown in FIG. 7 on the opposite face end, i.e. the left-hand face end in the illustration, in which on the air conditioning conduit a flange 81 is provided, to which a counter-flange 82 of a pipe segment to be connected is attached.

Of course, instead of sliding in, a separate coupling segment can also be provided by which the absorbing air conditioning conduit segment is connected to the non-absorbing pipe segment 80. According to the present disclosure, connection with other pipe segments is also provided in the other exemplary embodiments of the air conditioning conduit according to the present disclosure.

As furthermore shown in FIG. 7, according to an exemplary embodiment, the wall 60 at its face ends, in this case on the right-hand end, comprises a finishing cover layer 83 which closes off in an airtight manner the core material on the outward facing end faces. For example, the material of the closing-off cover layer 83 corresponds to the material of the first cover layer 62. In a further example, the closing-off cover layer 83 can be designed in one piece with the first cover layer 62.

According to one of various embodiments, the air outlet opening 58 is designed as an air outlet opening for introducing the air into a cabin interior space. For example, the air outlet opening forms a fan-shaped air outlet 84, which in FIG. 9 is diagrammatically shown in longitudinal section. As shown in FIG. 10, the sound-damping wall 52 is arranged on the lateral surfaces of the fan 84. In other words, according to the cross-sectional illustration, shown in FIG. 10, of the fan according to FIG. 9, the core layer 60 encloses a fan-shaped distribution hollow space 86 on the two longitudinal sides of the fan. The distribution of air to a multitude of outlet apertures 85 is indicated by arrows 87.

As diagrammatically shown in FIG. 10 by a dashed line, the acoustically absorbing wall 52 can also be provided in the region of the actual pipe layout, in FIGS. 9 and 10 above the fan-shaped region, or can make a transition from the pipe region to the fan region.

According to one of various exemplary embodiments, indicated in FIG. 11, the acoustically effective wall 52 is also provided on the face regions or lateral regions of the fan-shaped outlet 84 so that the acoustically effective wall 52 completely encloses the hollow space of the fan-shaped distribution region.

In the exemplary embodiment shown in FIG. 12, the core layer 60 on the side facing the hollow space 54 comprises the second cover layer 72, which has already been mentioned in the context of FIG. 7. In the exemplary embodiment shown in FIG. 13, the core layer 60 on the side facing the hollow space 54 comprises the second cover layer 74, which has already been explained with reference to the example of FIG. 8. Both in FIG. 11 and in FIG. 12, the dashed line 88 indicates that the acoustically absorbent wall 52 according to the present disclosure can also be provided in the tubular air conduit region that follows on from the distribution fan region.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. An air conditioning conduit a sound-damping effect for an aircraft, comprising:
    a sound-damping wall that at least partially encloses a substantially continuous hollow space for guiding the air, the continuous hollow space including an air inlet opening and an air outlet opening, and the continuous hollow space for the conveyance of air directly adjoins the wall, the wall having a multilayer design including:
    a core layer including a sound-absorbing open-pore core material so that the wall shows an acoustic effect; and
    at least one first cover layer designed so as to be airtight and arranged on the external surface of the core layer, and laminarily connected to the core layer;
    wherein the laminar connection between the core layer and the at least one first cover layer causes a composite effect in such a manner that the wall is self-supporting and has a structural function in order to be able to transfer mechanically-occurring loads to structural parts of the aircraft so that the wall also provides a load-bearing effect,
    wherein the at least one first cover layer is integral with the core layer, and the at least one first cover layer is formed by closing the outer pores of the open-pore core material, the outer pores of the open-pore core material closed by at least one of compressing the outer layer of core material and melting an outer region of the core material, and
    wherein the core layer comprises an open-pore foam material.

2. The air conditioning conduit of claim 1, wherein the core layer thermally insulates the hollow space vis-à-vis the surroundings.

3. The air conditioning conduit of claim 1, further comprising a second cover layer that is arranged on the internal surface of the core layer, wherein the second cover layer is acoustically transparent.

4. The air conditioning conduit of claim 3, wherein the second cover layer is a vapor barrier.

5. The air conditioning conduit of claim 1, wherein the air outlet opening is an air outlet opening for introducing air into a cabin interior space.

6. The air conditioning conduit of claim 5, wherein the air outlet opening forms a fan-shaped air outlet, and the sound-damping wall is arranged on the lateral surfaces of the fan-shaped air outlet.

7. An airplane comprising:
    a fuselage structure and a cabin formed within the fuselage; and
    an air conditioning system including an air conditioning unit and air conduits with air outlet openings, the air conduits conveying the air from the air conditioning unit to the air outlet openings in order to feed the conditioned air into the cabin space, and each of the air conduits further comprises:
    a core layer including a sound-absorbing open-pore core material; and
    at least one first cover layer designed so as to be airtight and arranged on the external surface of the core layer, and laminarily connected to the core layer,
    wherein the laminar connection between the core layer and the at least one first cover layer causes a composite effect in such a manner that the air conduit is self-supporting and has a structural function in order to be able to transfer mechanically-occurring loads to structural parts of the aircraft so that the air conduit also provides a load-bearing effect,
    wherein the at least one first cover layer is integral with the core layer to form one-piece, and the at least one first cover layer is formed by closing the outer pores of the open-pore core material, the outer pores of the open-pore material closed by at least one of compressing the outer layer of the core material and melting an outer region of the core material, and
    wherein the core layer comprises an open-pore foam material.

8. The airplane of claim 7, wherein the air conduits form a sound-damping wall that at least partially encloses a substantially continuous hollow space for guiding the air, the continuous hollow space including the air inlet opening and the air outlet opening, and the continuous hollow space for the conveyance of air directly adjoins the wall.

9. The airplane of claim 7, further comprising a second cover layer that is arranged on the internal surface of the core layer, wherein the second cover layer is acoustically transparent.

10. The airplane of claim 9, wherein the second cover layer is a vapor barrier.

11. The airplane of claim 8, wherein the air outlet opening forms a fan-shaped air outlet, and the sound-damping wall is arranged on the lateral surfaces of the fan-shaped air outlet.

12. The airplane of claim 8, wherein the core layer thermally insulates the hollow space.

\* \* \* \* \*